US009723155B2

(12) United States Patent
Narayanan

(10) Patent No.: US 9,723,155 B2
(45) Date of Patent: Aug. 1, 2017

(54) SYSTEMS AND METHOD FOR OFFLOADING COMMUNICATION SESSIONS TO LOCAL NETWORK RESOURCES

(71) Applicant: Verizon Patent and Licensing Inc., Arlington, VA (US)

(72) Inventor: Ram Gopal Lakshmi Narayanan, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 14/810,067

(22) Filed: Jul. 27, 2015

(65) Prior Publication Data
US 2017/0034761 A1 Feb. 2, 2017

(51) Int. Cl.
*H04M 15/00* (2006.01)
*H04L 12/14* (2006.01)
*H04W 4/24* (2009.01)
*H04W 40/20* (2009.01)
*H04L 12/741* (2013.01)

(52) U.S. Cl.
CPC .... *H04M 15/8228* (2013.01); *H04L 12/1407* (2013.01); *H04L 45/74* (2013.01); *H04W 4/24* (2013.01); *H04W 40/20* (2013.01)

(58) Field of Classification Search
None
See application file for complete search history.

(56) References Cited

U.S. PATENT DOCUMENTS

| 8,705,553 | B2 * | 4/2014 | Rune | H04W 8/082 370/428 |
| 9,020,512 | B2 * | 4/2015 | Xie | H04W 28/08 370/235 |
| 2011/0296719 | A1 * | 12/2011 | Sories | H04W 76/022 37/315 |
| 2012/0008554 | A1 * | 1/2012 | Kim | H04W 76/022 370/328 |
| 2012/0044949 | A1 * | 2/2012 | Velev | H04W 8/082 370/401 |
| 2012/0064908 | A1 * | 3/2012 | Fox | H04W 28/10 455/452.2 |

(Continued)

FOREIGN PATENT DOCUMENTS

| CN | WO 2008064584 A1 * | 6/2008 | ............ H04W 48/18 |
| CN | 101415243 A * | 4/2009 | |
| CN | 101193117 A * | 11/2011 | |

*Primary Examiner* — Steven H Nguyen

(57) ABSTRACT

Techniques described herein may be used to identify communication sessions (e.g., voice calls, video calls, etc.) that can be routed using local network resources, such as a base station to which the user devices are attached, and cause routing responsibilities for the session to be offloaded to the local network resources. Doing so may conserve network resources by alleviating the core network from having to support communication sessions that do not need to be routed through the core network. In turn, this may reduce the potential for network latency since: 1) core network resources will be more available to support sessions that actually need to be routed through the core network; and 2) sessions that do not need to be routed through the core network can be routed over shorter distances that involve fewer network devices (e.g., a based station).

20 Claims, 10 Drawing Sheets

(56) References Cited

U.S. PATENT DOCUMENTS

| | | | |
|---|---|---|---|
| 2012/0149382 A1* | 6/2012 | Fox | H04W 36/245 |
| | | | 455/445 |
| 2013/0054831 A1* | 2/2013 | Calo | H04L 67/2814 |
| | | | 709/238 |
| 2013/0084875 A1* | 4/2013 | Xie | H04W 28/08 |
| | | | 455/445 |
| 2014/0126539 A1* | 5/2014 | Adachi | H04W 36/08 |
| | | | 370/331 |
| 2014/0133458 A1* | 5/2014 | Adachi | H04W 36/0016 |
| | | | 370/331 |
| 2014/0160965 A1* | 6/2014 | Moon | H04W 8/005 |
| | | | 370/252 |
| 2014/0348074 A1* | 11/2014 | Lu | H04W 28/16 |
| | | | 370/329 |
| 2015/0373730 A1* | 12/2015 | Fujishiro | H04L 1/0003 |
| | | | 455/450 |

\* cited by examiner

SYSTEMS AND METHOD FOR OFFLOADING COMMUNICATION SESSIONS TO LOCAL NETWORK RESOURCES

BACKGROUND

Users often use services, such as FaceTime, Skype, etc., to communicate with one another. Such services can be latency sensitive in that high network latency can undermine the service. When two users communicate with one another using such services, the information from one user may traverse several networks (e.g., a radio access network (RAN), a core network, the Internet, etc.) in order to reach the other user.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to increase network performance and conserve network resources by identifying communication sessions (e.g., voice calls, video calls, instant messaging sessions, etc.) that can be routed using local network resources, such as a base station to which the user devices are attached, and causing routing responsibilities for the session to be offloaded to the local network resources. For example, when one user device initiates a communication session with another user device, the network may determine whether the session is local (e.g., whether both user devices are being serviced by the same base station or radio access network (RAN)). When the call is not local, the network may continue to support the session in a typical fashion, which may involve routing the call through a RAN serving the user device, a core network supporting the RAN, the Internet, and ultimately to another RAN servicing the other user device.

However, when the session is local, the network may cause the session to be routed locally through the RAN (e.g., a base station), instead of through the core network, the Internet, etc. Doing so may conserve network resources by alleviating the core network from having to support communication sessions that do not need to be routed through the core network. In turn, this may reduce the potential for network latency since: 1) core network resources will be more available to support sessions that actually need to be routed through the core network; and 2) sessions that do not need to be routed through the core network can be routed over shorter distances that involve fewer network devices, thereby decreasing the chance of latency issues resulting from by unrelated issues or unforeseen circumstances that could occur within a much larger network.

Figure 1A:
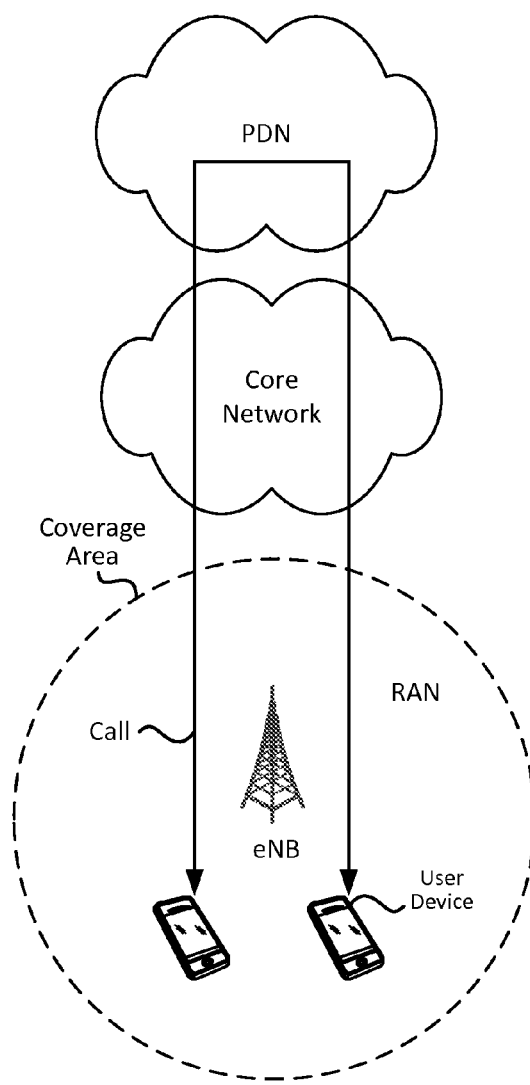
FIGS. 1A and 1B illustrate an example overview of an implementation described herein.
Figure 1B:
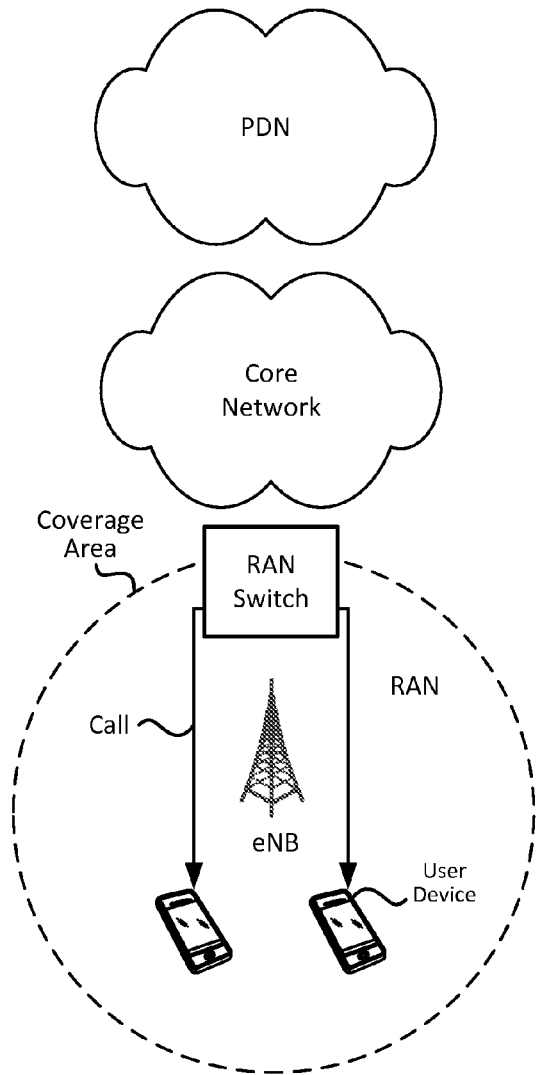

FIGS. 1A and 1B illustrate an example overview of an implementation described herein. FIG. 1A may represent a network path for a communication session between two user equipment devices (or UEs) prior to allocating the session to local network resources. As shown in FIG. 1A, user devices may be located in the coverage area of a RAN that includes an Enhanced Node B (eNodeB or eNB). Initially, a session between the user devices may be established in a typical fashion, which may include routing the session from the RAN, to a core network, to a packet data network (e.g., the Internet), and back again. As the session is being established, one or more devices in the core network may determine that the session is a local session since both user devices are attached to the same eNB. In response, and as shown in FIG. 1B, the network may cause the session to be routed through a RAN switch, which may be a part of the eNB. As a result, the users may experience enhanced network services because of the shorter, more simplified network path for the session, and core network resources may be allocated more efficiently since the core network does not have to maintain a network path for the session or route session data through the core network.

Figure 2:
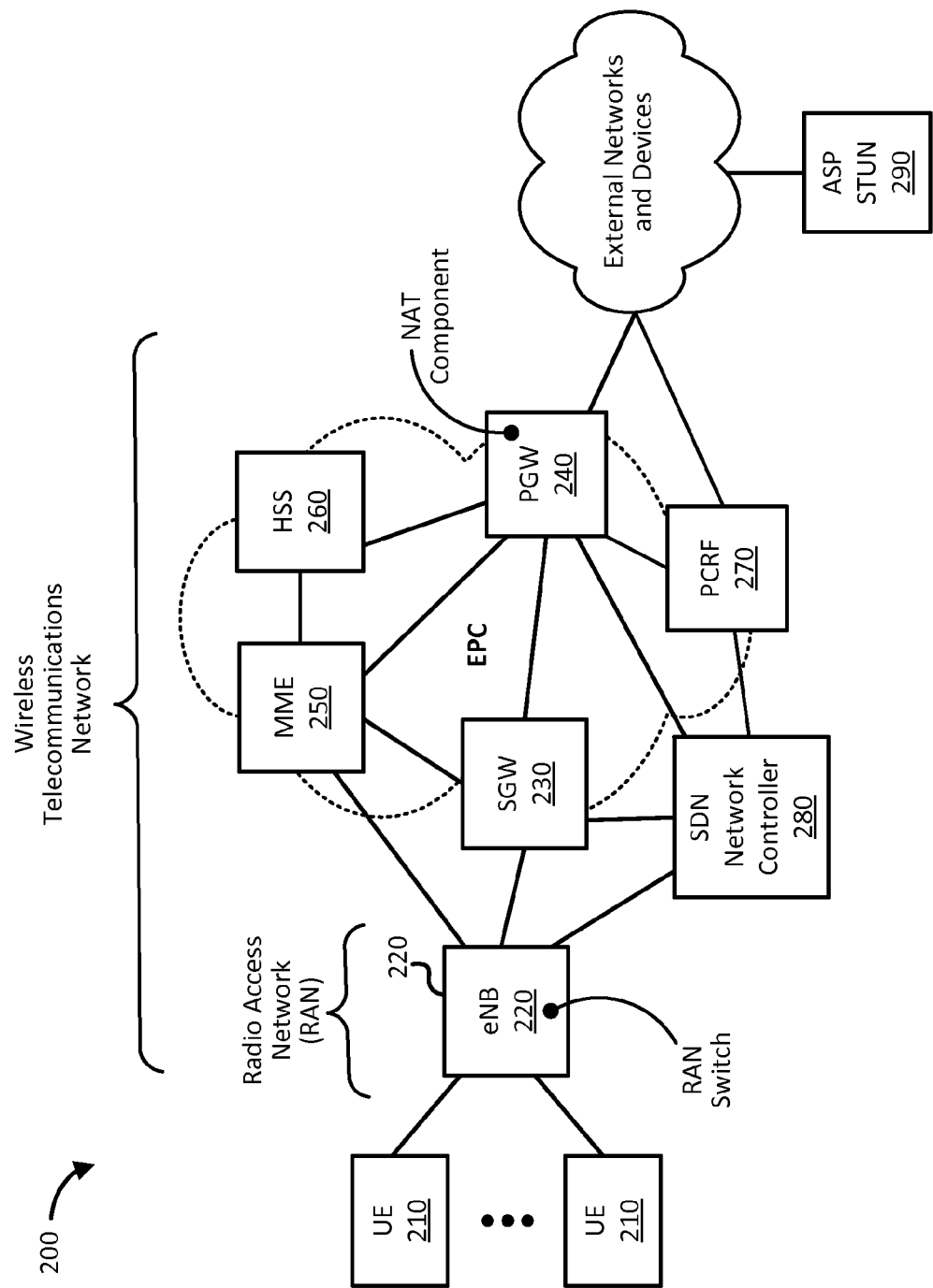
FIG. 2 is a diagram of an example environment in which systems and/or methods described herein may be implemented.

FIG. 2 is a diagram of an example environment 200 in which systems and/or methods described herein may be implemented. Environment 200 may include UE 210, wireless telecommunications network, external networks and devices, and application service provider (ASP) session traversal utilities for network address translation (STUN) 295.

In FIG. 2, wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, a RAN that includes one or more base stations, some or all of which may take the form of eNBs 220, via which UEs 210 may communicate with the EPC network.

The EPC network may include Serving Gateway (SGW) 230, PDN Gateway (PGW) 240, Mobility Management Entity (MME) 250, Home Subscriber Server (HSS) 260, Policy and Charging Rules Function (PCRF) 270, and/or Software Defined Network (SDN) controller (or SDN network controller) 280. As shown, the EPC network may enable UEs 210 to communicate with an external network, such as a Public Land Mobile Networks (PLMN), a Public Switched Telephone Network (PSTN), and/or an Internet Protocol (IP) network (e.g., the Internet).

UE 210 may include a portable computing and communication devices, such as a personal digital assistant (PDA), a smart phone, a cellular phone, a laptop computer with connectivity to the wireless telecommunications network, a tablet computer, etc. UE 210 may also include non-portable computing device, such as a desktop computer, a consumer or business appliance, or another device that has the ability to connect to the RAN of the wireless telecommunications network. UE 210 may be capable of establishing a communication session (e.g., a voice call, a video call, an instant messaging session, etc.) with another UE 210 via the wireless telecommunications network. The call may be a simple voice call, a conference call, a video call, an instant messaging session, a session involving a peer-to-peer connection, etc.

eNB 220 may include one or more network devices that receive, process, and/or transmit traffic destined for and/or received from UE 210 (e.g., via an air interface). eNB 220 may include a network device, such as a switch, a gateway, a router, etc., that is capable of implementing policies and techniques for routing communication sessions. For instance, eNB 220 may implement a hairpin routing technique so that a communication session involving UEs 210 attached to eNB 220 is routed locally by eNB 220 (instead of being routed through the EPC). eNB 220 may also be capable of collecting charging data for a locally routed session and providing the charging data to the EPC so that the wireless telecommunications network may implement charging policies for locally routed sessions.

SGW 230 may aggregate traffic received from one or more eNBs 220 and may send the aggregated traffic to an external network or device via PGW 240. Additionally, SGW 230 may aggregate traffic received from one or more PGWs 240 and may send the aggregated traffic to one or more eNBs 220. SGW 230 may operate as an anchor for the user plane during inter-eNB handovers and as an anchor for mobility between different telecommunication networks.

MME 250 may include one or more computation and communication devices that act as a control node for eNB 220 and/or other devices that provide the air interface for the wireless telecommunications network. For example, MME 250 may perform operations to register UE 210 with the wireless telecommunications network, to establish bearer channels (e.g., traffic flows) associated with a session with UE 210, to hand off UE 210 to a different eNB, MME, or another network, and/or to perform other operations. MME 250 may perform policing operations on traffic destined for and/or received from UE 210.

PGW 240 may include one or more network devices that may aggregate traffic received from one or more SGWs 230, and may send the aggregated traffic to an external network. PGW 240 may also, or alternatively, receive traffic from the external network and may send the traffic toward UE 210 (via SGW 230 and/or eNB 220). In some implementations, PGW 240 may participate in identifying local calls and offloading local calls to local network resources. For example, PGW 240 may provide NAT services (e.g., via a NAT component) whereby the network may determine whether the UEs involved in a call are being serviced by the same eNB 220 or RAN. PGW 240 may also preserve NAT information for a session that has been offloaded to local network resources, such as eNB 220. PGW 240 may be responsible for providing charging data for each communication session to PCRF 270 to help ensure that charging policies are properly applied to communication sessions with the wireless telecommunication network.

HSS 260 may include one or more devices that may manage, update, and/or store, in a memory associated with HSS 260, profile information associated with a subscriber (e.g., a subscriber associated with UE 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 210. Additionally, or alternatively, HSS 260 may perform authentication, authorization, and/or accounting operations associated with the subscriber and/or a communication session with UE 210.

PCRF 270 may receive information regarding policies and/or subscriptions from one or more sources, such as subscriber databases and/or from one or more users. PCRF 270 may provide these policies to PGW 240 or another device so that the policies can be enforced. As depicted, in some implementations, PCRF 270 may communicate with PGW 240 to ensure that charging policies are properly applied to locally routed sessions within the telecommunications network. For instance, after a locally routed session is terminated, PGW 240 may collect charging information regarding the session and provide the charging information to PCRF 270 for enforcement.

SDN network controller 280 may include one or more computation and communication devices to enable the wireless telecommunications network to offload local communication sessions to local network resources. For instance, SDN network controller 280 may assess whether network devices (e.g., eNB 220, SGW 230, PGW 240, etc.) are capable of identifying local communication sessions and offloading the sessions from the EPC (e.g., PGW 240) to local network resources (e.g., eNB 220). SDN network controller 280 may also assist PGW 240 in collecting the charging data associated with the locally routed session so that charging policies for locally routed sessions are implemented properly.

As depicted in FIG. 2, SDN network controller 280 may be implemented by a network device (such as a server) that is separate and distinct from the other network devices of the wireless telecommunications network. However, in some implementations, SDN network controller 280 may be implemented by an existing network device, such as PGW 240, or a combination of network devices. Additionally, in some implementations, operations described herein as being performed by another device, such as eNB 220 or PGW 240, may instead be performed by SDN network controller 280.

ASP STUN 290 may include one or more computation and communication devices capable of providing communication services to UE 210. For example, when a session is initiated by UE 210, UE 210 may communicate with ASP STUN 290 in order to discover the presence of NAT services provided by the wireless telecommunications network. ASP STU 290 may obtain a mapped public IP address (and possibly a port number in the case of IPv4) that the NAT service has allocated to UE 210 for the session and communicate the public IP address and port number to UE 210, which may enable UE 210 engage in peer-to-peer communication services despite operating behind a NAT device (e.g., PGW 240). In some implementations, ASP STUN 290 may also support peer-to-peer communication services, such as video calls, Voice-over-IP (VoIP) calls, instant messaging, etc. However, as described below, for sessions that are offloaded local network resources, the interaction between UE 210 and ASP STUN 290 may be limited to initiation and termination of the session.

Figure 3:
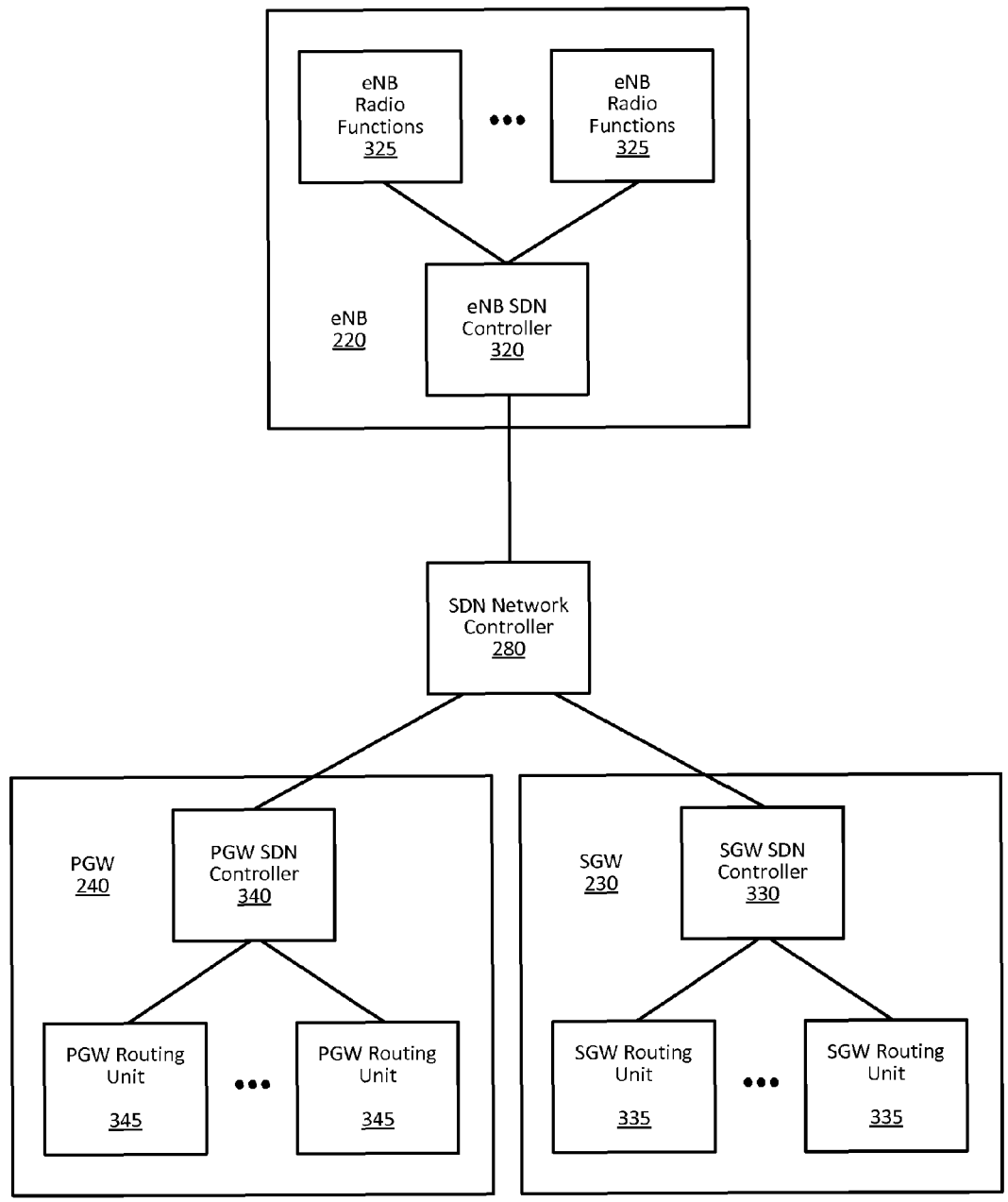
FIG. 3 is a diagram of example network devices with software-defined network (SDN) capabilities.

FIG. 3 is a diagram of example network devices with software-defined network (SDN) capabilities. As shown, the example network devices may include eNB 220, SGW 230, PGW 240, and SDN network controller 280. eNB 220 may include an eNB SDN controller 320 and one or more eNB radio functions 325. SGW 230 may include SGW SDN controller 330 and one or more PGW routing units 335. PGW 240 may include PGW SDN controller 340 and one or more PGW routing units 345. eNB SDN controller 320 may include an eNB controller that is SDN enabled. Similarly, PGW SDN controller 340 may include a PGW controller that is SDN enabled, and SGW SDN controller 330 may include an SGW controller that is SDN enabled.

When SDN network controller 280 is deployed in the wireless telecommunications network, SDN network controller 280 identify each device in the network (e.g., eNB 220, SGW 230, PGW 240, etc.). In addition, SDN network controller 280 may communicate with each device to collect information regarding the capabilities of each device, the location of each device, the resources available to each device, policies and procedures implemented by each device, etc. SDN network controller 280 may use the information to map the devices in the network along with the capabilities and constraints of the devices in terms of identifying local communication sessions, offloading local sessions to local resources, and performing one or more other operations described herein.

Based on, for example, the capabilities of the network, SDN network controller 280 may program or configure eNB 220, SGW 230, PGW 240, and/or other network devices to operate in a specified manner. For instance, SDN network controller 280 may program eNB SDN controller 320 to have eNB radio functions 325 implement a local routing strategy (e.g., hairpin routing) in response to a request to do so from SDN network controller 280. As another example, SDN network controller 280 may program or configure SGW SDN controller 330 to cause SGW routing units 335 to delete routing information used to route a communication session once the session has been offloaded to local network resources. As yet another example, SDN network controller 280 may program or configure PGW SDN controller 340 to cause PGW routing units 345 to preserve NAT information for a communication session even after the session has been offloaded to local network resources. As such, SDN network controller 280 may be capable of determining the network devices and capabilities of a wireless telecommunications network and programming the network devices to ensure that the wireless telecommunications network operates to perform one or more of the functionalities described herein In the example depicted in FIG. 3, each network device includes one controller in communication with multiple functions or routing units of a single device. For instance, eNB 220 includes one eNB SDN controller 320 that controls multiple eNB radio functions 325 of a single eNB 220. In some implementations, however, one controller may control multiple network devices. For instance, one eNB SDN controller 320 may be capable of controlling multiple eNBs 320 that each include multiple eNB radio functions 325. Similarly, one PGW SDN controller 340 may be capable of controlling multiple PGWs 340 that each include multiple PGW routing units 345. As such, the arrangement of network devices, controllers, and device resources (e.g., eNB radio functions 325, SGW routing units 335, etc.) depicted in FIG. 3 is provided as a non-limiting example since many alternative arrangements may be possible.

Figure 4:
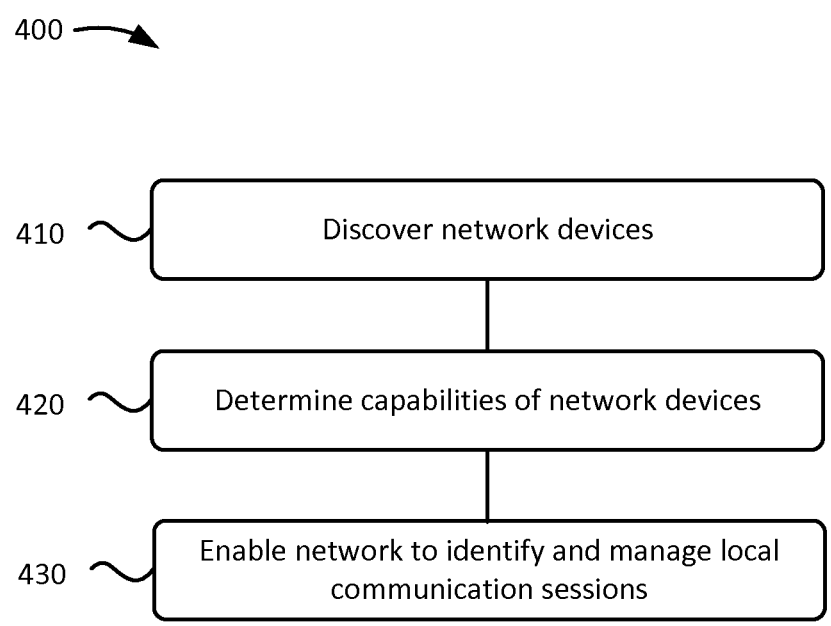
FIG. 4 is a flowchart of an example process for configuring network devices to offload local sessions to local network resources.

FIG. 4 is a flowchart diagram of an example process 400 for configuring network devices to offload local sessions to local network resources. Process 400 may be implemented by SDN network controller 280.

As shown, process 400 may include discovering network devices (block 410). For example, SDN network controller 280 may communicate with one or more network devices in a wireless telecommunications network in order to identify the devices that make up the network. In some implementations, SDN network controller 280 may attempt to discover network devices in response to being deployed in the wireless telecommunications network. Additionally, or alternatively, SDN network controller 280 may attempt to discover network devices in response to being updated (e.g., installing a software update), receiving a command from a network administrator, based on a pre-selected schedule, etc.

Process 400 may include determining 420 the capabilities of network devices (block 420). For instance, SDN network controller 280 may communicate with network devices in order to determine whether the network is capable of executing one or more of the processes or procedures described herein. For instance, SDN network controller 280 may verify that eNB 220 includes an eNB SDN controller 320 capable of causing eNB radio functions 325 to implement a local routing strategy with respect to a particular communication session. As another example, SDN network controller 280 may communicate with PGW SDN controller 340 to verify that PGW 240 is capable of providing NAT services, identifying local sessions based on the NAT information, maintaining NAT information for offloaded sessions, etc.

Process 400 may include enabling a network to identify and manage local communication sessions (block 430). For example, SDN network controller 280 may program or configure PGW 240 to detect local communication sessions by analyzing NAT information to identify communication sessions where the UEs 210 involved in the communication session are attached to the same eNB 220 or RAN. As another example, SDN network controller 280 may program or configure eNB 220 to implement a local routing technique for a communication session in response to a request to do so from SDN network controller 280. SDN network controller 280 may also provide instructions to eNB SDN controller 320 to collect charging data for local sessions that are offloaded to eNB 220 and to provide the charging data to SDN network controller 280 when the local calls are terminated. In some implementations, SDN network controller 280 may program PGW 240 by modifying the NAT functionality of PGW 240 by modifying PGW 240 to detect when two users are communicating logically (e.g., via the same communication session), and SDN network controller may subscribe to receive notifications of the trigger condition of the users communicating logically.

In yet another example, SDN network controller 280 may program or control PGW 240 to store NAT information associated with offloaded sessions until a request to delete the NAT information is received from SDN network controller 280. SDN network controller 280 may also program PGW 240 to store any charging information that was collected for a communication session before the communication session was offloaded to local network resources. In addition, SDN network controller 280 may program PGW 240 to receive charging information collected while the session was offloaded and to combine the charging information from before the session was offloaded with the charging information while the sessions was offloaded to provide PCRF 270 with a complete record of charging data for the communication session. In some implementations, SDN network controller 280 may program PGW 240 may modifying existing NAT functionality of the PGW 240 to support local routing of communication session and operate in a manner that is consistent with what is described herein.

Figure 5:
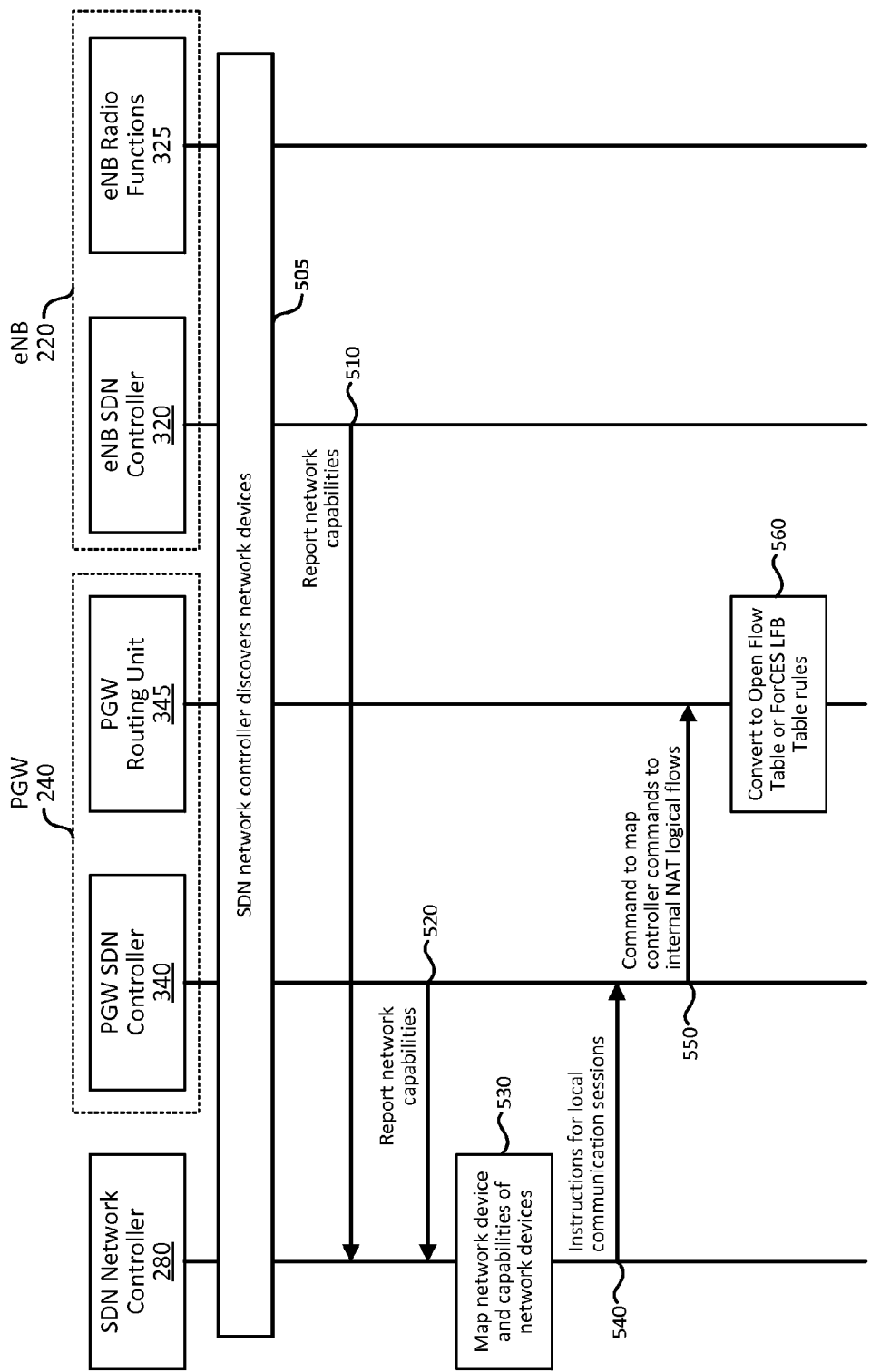
FIG. 5 is a sequence flow diagram of an example for programming a network to offload local communication sessions to local network resources.

FIG. 5 is a sequence flow diagram of an example for programming a network to offload local communication sessions to local network resources. FIG. 5 may include specific examples of one or more of the operations discussed above with reference to process 400 of FIG. 4.

SDN network controller 280 may discover network devices such as eNB 220 and PGW 240 (block 505). At some point, eNB 220 and PGW 240 may communicate network capabilities to SDN network controller 280 (lines 510 and 520). Examples of the network capabilities may include the routing capacity of eNB 220 and PGW 240, whether PGW 240 provides NAT services for communication sessions, an indication of the current network traffic load of eNB 220 and PGW 240, etc. Additional examples of network capabilities may include whether eNB 220 is capable of implementing local routing techniques for communication sessions, whether PGW 240 is capable of implementing one or more protocols (e.g., OpenFlow protocol or ForCES protocol), etc.

SDN network controller 280 may map the network devices and the capabilities of the network devices (block 530). For instance, SDN network controller 280 may compile the information received from discovering network devices and receiving network capability information into an organized data set that represents the current state and capabilities of the network with respect to managing local communication sessions. As such, SDN network controller 280 may obtain an accurate picture of the current state of the wireless telecommunications network, which may be used by SDN network controller 280 to determine: 1) whether the network is capable of managing local communication sessions as described herein; and 2) whether SDN network controller 280 should program or configure the network devices to ensure that the network devices operate accordingly.

SDN network controller 280 may generate instructions for handling local communication sessions and may provide the instructions to PGW SDN controller 340 (line 540). For example, SDN network controller 280 may provide PGW SDN controller 340 with instructions for monitoring new sessions and differentiating between sessions that are local and sessions that are not. As another example, SDN network controller 280 may provide PGW SDN controller 340 with instructions for notifying SDN network controller 280 each time PGW SDN controller 340 detects a local call, and instructions for maintaining NAT information for the call even after the call has been offloaded to eNB 220. Additional examples of such instructions may include instructions for implementing routing standards and protocols, such as OpenFlow protocol, Forwarding and Control Element Separation (ForCES) framework, etc.

PGW SDN controller 340 may receive the instructions from SDN network controller 280 and may communicate with PGW routing unit 345 to map the instructions to internal NAT logical flows (line 550). An internal NAT logical flow may include operations for setting up NAT tables for a communication session in order to represent IP addresses, ports, and protocols that may be involved in the communication session. Internal NAT logical flows may also include operations for maintaining NAT information for a communication session even though the communication sessions has been offloaded to local network resources and/or terminating the NAT information once the communication session has been terminated.

In addition, PGW routing unit 345 may implement routing standards and protocols based on the instructions received from SDN network controller 280. For instance, as a result of the instructions from SDN network controller 280, PGW routing unit 345 may implement OpenFlow protocol or the ForCES framework (block 560). In some implementations, implementing a protocol, such as OpenFlow or ForCES, may enable PGW 240 to separate fast packet forwarding capabilities (e.g., the user plane) from high level routing decisions (e.g., the control plane), which may be beneficial in scenarios where the user plane is offloaded to eNB 220 and the control plane is maintained by PGW 240 for the duration of the call.

Figure 6:
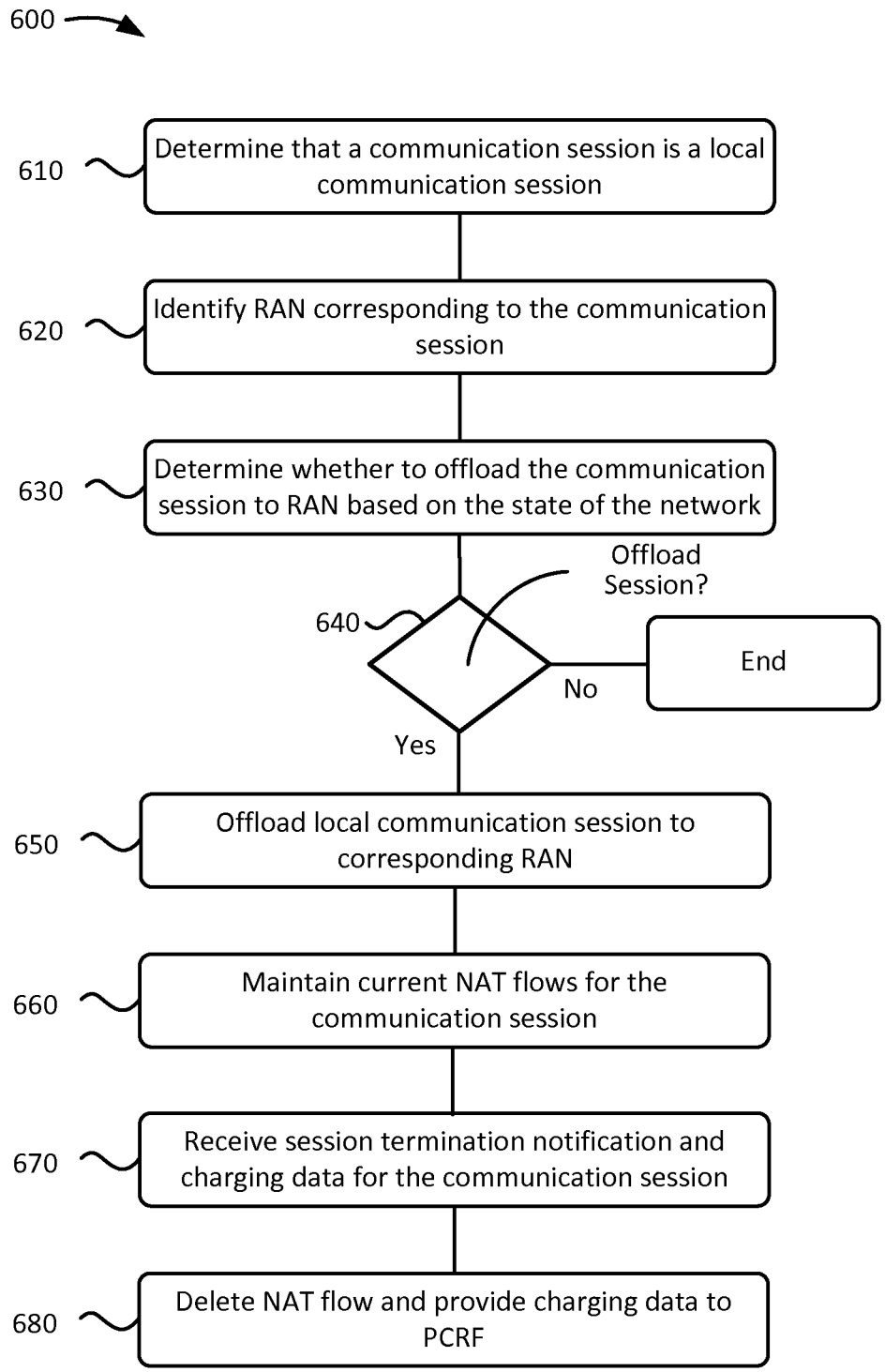
FIG. 6 is a flowchart of an example process for offloading a local session to local network resources.

FIG. 6 is a flowchart diagram of an example process 600 for offloading a local session to local network resources. As described below, process 600 may be implemented by a combination of network devices, such as SDN network controller 280 and PGW 240. However, process 600 may also be implemented by a single network device, such as SDN network controller 280 or PGW 240.

As shown, process 600 may include determining that a communication session is a local communication session (block 610). For example, PGW 240 may analyze NAT flows (e.g., NAT information describing IP addresses, port numbers, and protocols corresponding to the communication session) to determine whether or not communication sessions are local (e.g., whether or not user devices 210 involved in the communication session are connected to the same RAN). In some implementations, PGW 240 may do so by comparing the source and destination addresses (and the source and destination port numbers) associated inbound traffic and outbound traffic. For instance, when the source address and port number for inbound traffic is the same as the destination address and port number for outbound traffic (and vice versa), PGW 240 may determine that communication session is local because the UEs 210 are connected to the same RAN. In some implementations, when PGW 240 determines that a communication session is local, PGW 240 may notify SDN network controller 280 regarding the local communication session.

PGW 240 may be SDN enabled and may expose internal NAT table entries for management. Apart from traditional NAT, it may include extra control notifications so that PGW 240 may send a trigger message when two users behind Carrier Grade (CG) NAT are communicating with one another. For example with traffic from one user device 210 (e.g., a first user device) is seen for the first time by NAT services, PGW 240 may create an outbound NAT table entry with the source IP address being the IP address of the first user device 210, the destination IP address being the public IP address of the NAT, port numbers (public and private), and the protocol being used. Additionally, when the NAT services see the traffic of another user device 210 (e.g., a second user device 210 communicating with the first user device), the NAT services may create an outbound NAT table entry for the second user device 210 in a similar manner. PGW 240 may compare the NAT table entries to determine whether the two users are behind the same NAT (e.g., engaged in a local call).

Process 600 may include identifying the RAN corresponding to the communication session (block 620). For example, SDN network controller 280 may receive a notification from PGW 240 that a communication session is local. The notification may include an identifier of user devices 210 involved in the communication session and the RAN (or eNB 220) to which the user devices are attached. The notification information may also include routing information (e.g., private IP addresses and ports of the user devices) that SDN network controller 280 may later convey to the RAN in order to have the communication session routed locally by the RAN.

Process 600 may include determining whether to offload the communication session to the identified RAN based on a current state of the network (block 630). For instance, SDN network controller 280 may monitor the internal state of the network (e.g., network latency, congestion, traffic load, network resource availability, etc.) in order to determine whether it would be good for the network to offload local communication sessions to local network resources (e.g., eNB 220). The determination may be based on the operating state of an individual network device, such as eNB 220, PGW 240, etc. Additionally, the determination may be based on the state of a portion of the network, such as the RAN corresponding to the communication session, the core network, etc. In some implementations, the determination may be based on other factors as well, such as a prediction of whether the state of the network is likely to change (for better or worse) based on the current time, day, and/or network conditions. As such, SDN network controller 280 may monitor the state of the network and/or specific devices within the network in order to determine whether it would benefit the network to offload local communication sessions to local network resources.

As depicted in FIG. 6, if SDN network controller 280 determines not to offload the communication session (block 640—No), process 600 may be discontinued. However, if SDN network controller 280 determines that the communication session should be offloaded (block 640—Yes), process 600 may include offloading the communication session to the corresponding RAN (block 650). For instance, SDN network controller 280 may communicate a request to eNB 220 to implement a hairpin routing scheme with respect to the communication session. The hairpin routing scheme may enable eNB 220 to support the communication session locally (without routing data plane information through the core network).

Process 600 may include maintaining current NAT flows for the communication session (block 650). For example, SDN network controller 280 may provide PGW 240 a request or instructions to maintain a record of the NAT flow for the communication session even though the data plane for the communication session is being supported by eNB 220 locally. In some implementations, a record of the NAT flow for the communication session may be maintained by PGW 240 until the communication session is terminated.

Process 600 may include receiving a communication session termination notification and charging data for the communication session (block 670). For instance, SDN network controller 280 may receive a notification from eNB 220 that UEs 210 have ended the communication session. eNB 220 may also provide the charging data for the communication session to SDN network controller 280. In response, SDN network controller 280 may instruct PGW 240 to delete the NAT flow for the communication session. In addition, SDN network controller 280 may provide the charging data for the communication session to PGW 240. PGW 240 may delete the record of the NAT flow for the communication session and provide the charging data to PCRF 270 (block 680).

Figure 7:
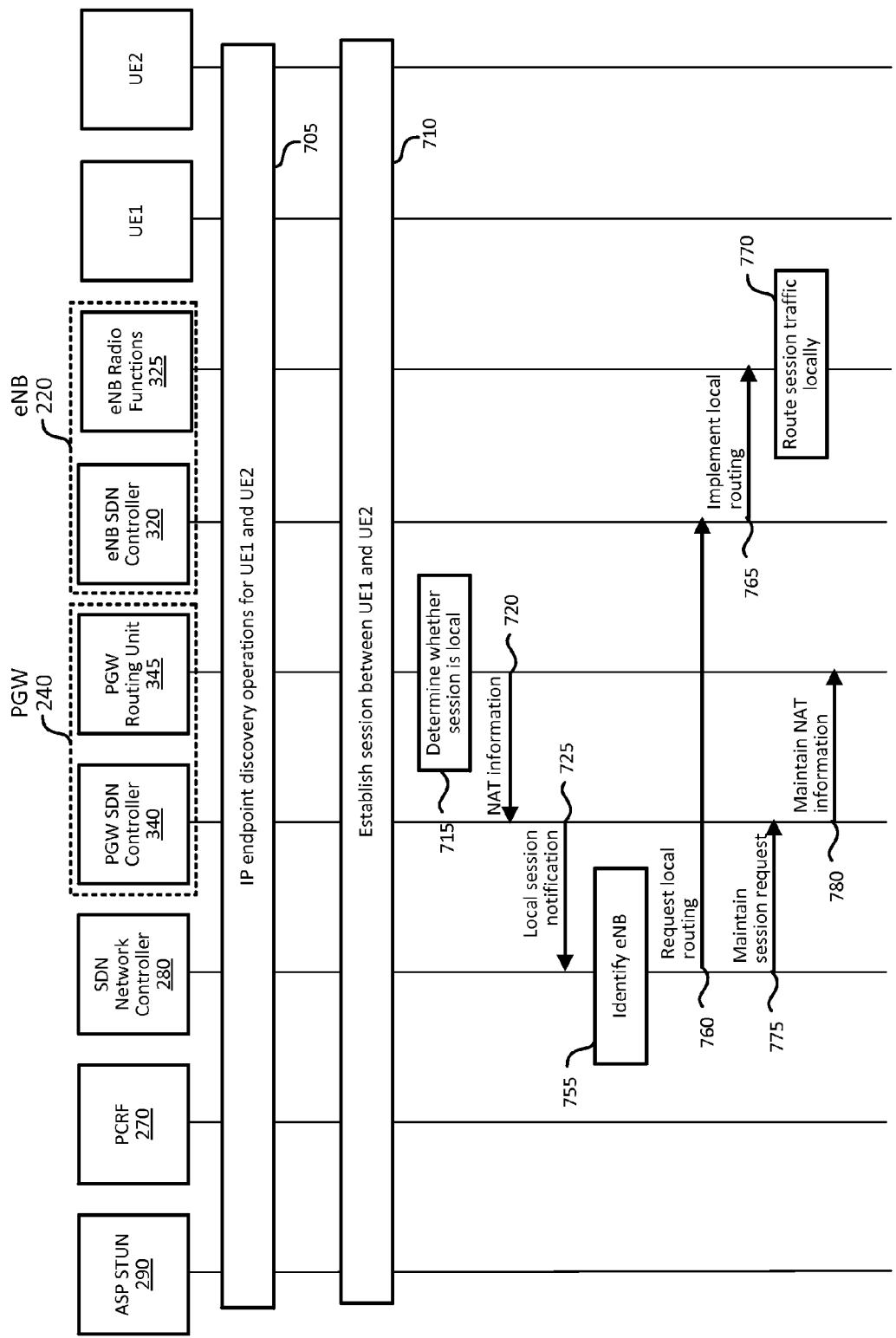
FIG. 7 is a sequence flow diagram of an example for offloading a local session to local network resources.

FIG. 7 is a sequence flow diagram of an example for offloading a local session to local network resources. FIG. 7 may include examples of one or more operations of process 600. As shown, FIG. 7 includes UE1 and UE2, which may include specific examples of UE 210. Also included are eNB 220, PGW 240, PCRF 270, SDN network controller 280, and ASP STUN 290. A description of these devices is provided above with reference to FIG. 2.

As shown, IP endpoint discovery operations may be performed for UE1 and UE2 (block 705). For instance, UE1 and UE2 may communicate IP endpoint discovery requests to ASP STUN 290 via PGW 240. In some implementations, the IP endpoint discovery operation may include a binding request in accordance with the STUN protocol. As PGW 240 may provide NAT services for UE1 and UE2, the IP endpoint discover operation may prompt PGW 240 to create NAT associations for UE1 and UE2. In implementations involving IPv4, the NAT associations may include associating a source IP addresses (e.g., a private IP address of UE1 and UE2) and port numbers of UE1 and UE2 with a public IP address and port numbers of PGW 240. In implementations involving IPv6, the NAT associations may include logically associating the private IP address of UE1 and UE2 with public IP addresses of PGW 240. Additionally, in some implementations, the NAT associations may also include logically associating IP addresses and/or ports with a particular protocol being used (e.g., UDP, TCP, etc.).

A communication session between UE1 and UE2 may be established (block 710). For example, UE1 may communicate a request, to ASP STUN 290 in order to establish a communication session with UE2 that involves a service provided by ASP STUN 290 (e.g., a video call, a VoIP call, etc.). In response to the request, ASP STUN 290 may facilitate the session between UE1 and UE2 in accordance with an appropriate protocol for the requested service. Additionally, as PGW 240 may be providing NAT services to UE1 and UE2, PGW 240 may update NAT information to represent the communication session between UE1 and UE2.

PGW routing unit 345 may analyze the NAT information to determine whether the session is a local session (720). From a NAT perspective, user devices associated with traffic flows with the same public IP address (but different port numbers (for IPv4)) may be indicative of a local session. PGW routing unit 345 may send the NAT information to PGW SDN controller 340 (line 720), and PGW SDN controller 340 may notify SDN network controller 280 about the local session (line 725). The notification from PGW SDN controller 340 may include the NAT information from PGW routing unit 345 and other information that may be required to offload the session to eNB 220. Such information may include an identifier of the RAN or eNB 220 to which UE1 and UE2 are connected. Additionally, the information may include identifiers of other network devices (e.g., SGW 230, MME 250) and other information for ensuring that the control plane for the session remains in tack and/or for enabling SDN network controller 280 to free up network resources that were used to establish the user plane at the beginning of the session (see, e.g., block 710).

SDN network controller 280 may identify eNB 220 based on the information provided by PGW SDN controller 240 (block 755) and send a request for local routing to eNB 220. The request may be for eNB 220 to implement a particular routing technique, such as hairpin routing, where eNB 220 ensures that traffic between UE1 and UE2 is routed locally despite, for example, being directed to destinations outside of the corresponding RAN. The request from SDN network controller 280 may cause eNB 220 to activate NAT services, or other active routing services, for the session. For instance, the request may cause eNB SDN controller 320 to identify the session associated with UE1 and UE2 and determine an appropriate NAT flow for ensuring that the session is routed locally. Additionally, eNB SDN controller 320 may communicate a command to eNB radio functions 325 (line 765) so that the local routing is actually carried out by the eNB radio functions 325 (block 770).

SDN network controller 280 may also communicate a request to PGW 240 to implement a maintenance policy with respect to the NAT information corresponding to the session (line 775). For instance, PGW SDN controller 340 may instruct PGW routing unit 345 to continue storing the NAT information for the session even though the session is not being routed through PGW 240 (line 780). For instance, when traffic is being routed locally with eNB 220, a NAT timer of PGW 240 could expire, to avoid timer expiry either the SDN controller or port control protocol, operations of PGW 240 may be implemented to explicitly keep the NAT association active till the communication session is completed. As an example, SDN network controller 280 may occasionally generate fake "keep alive" packets to PGW 240 (for the appropriate address and port number) so that PGW 240 thinks the session is continuing as normal. As such, the sequence flow diagram of FIG. 7 provides an example of techniques for establishing a session between UEs 210, determining that the session is local with respect to the wireless telecommunications network, and offloading the routing of the session to local network resources (e.g., eNB 220).

Figure 8:
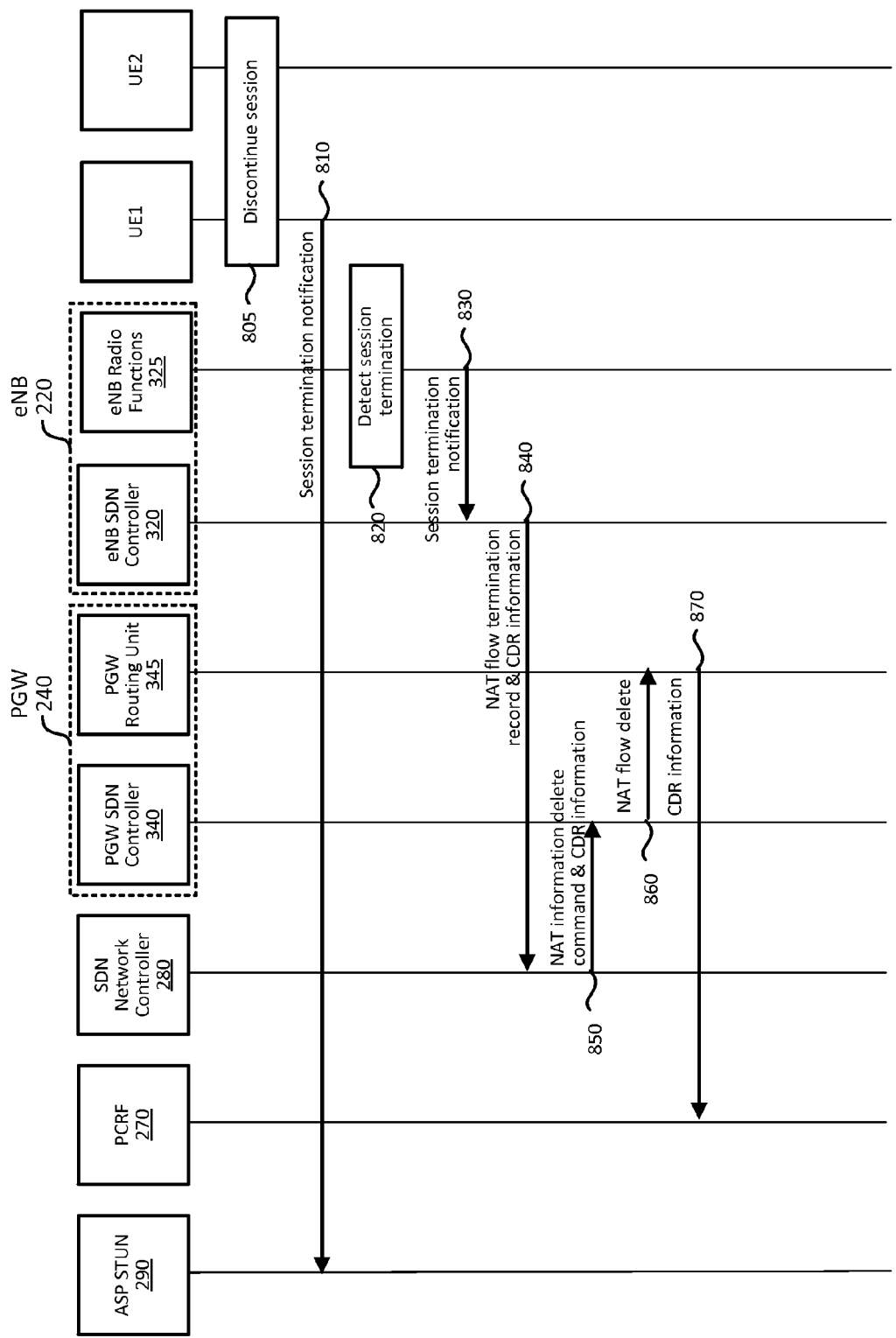
FIG. 8 is a sequence flow diagram of an example for terminating a session that has been offloaded to local network resources.

FIG. 8 is a sequence flow diagram of an example for terminating a session that has been offloaded to local network resources. FIG. 8 may be viewed as an extension to the sequence flow diagram of FIG. 7 and may include examples of one or more operations of process 600. As shown, FIG. 8 includes UE1 and UE2, eNB 220, PGW 240, PCRF 270, SDN network controller 280, and ASP STUN 290.

A communication session between UE1 and UE2 may be discontinued by UE1 or UE2 hanging up, closing an application used to establish the session, etc. (block 805). In response, UE1 (or UE2) may notify ASP STUN 290 that the session is over (line 810). In some implementations, the notification may include a message that is consistent with the protocol used to establish the session, such as UDP, TCP, etc. Additionally, eNB radio functions 325 may detect the termination of the session (block 820). For instance, eNB 220 may monitor an activity timer (e.g., a NAT timer) for each session corresponding to eNB 220. If/when network activity for the session is not received before the activity time expires, eNB 220 may conclude that the session has been terminated. In some implementations, eNB radio functions 325 may detect that the session has been terminated in response to receiving a particular type of message, such as a TCP FIN message for a TCP session. Detecting that a locally routed session has been terminated may prompt eNB 220 to delete NAT information corresponding to the terminated session.

eNB radio functions 325 may notify eNB SDN controller 320 about the session being terminated (line 830), and eNB SDN controller 320 may provide SDN network controller 280 with a record of the NAT flow termination and/or charging data records (CDR) corresponding to the communication session (line 840). SDN network controller 280 may have instructed eNB 220 to collect CDR records for the communication session when the routing responsibilities for the session were offloaded to eNB 220. As such, when the communication session is terminated, eNB 220 may notify SDN network controller 280 of the terminated session and provide the collected CDR information to SDN network controller 280. SDN network controller 280 may respond to the notification by providing instructions to PGW 240 to delete NAT information corresponding to the terminated session (block 850), which PGW 240 may implement via communications between PGW SDN controller 340 and PGW routing unit 345 (line 860). In some implementations, SDN network controller 280 may also provide the CDR information to PGW 240, and in turn, PGW 240 may combine the received CDR information with CDR information that PGW 240 may have collected before the session was offloaded to eNB 220, in order to provide all the CDR information for the session to PCRF 270 for billing and record keeping purposes (line 870).

Figure 9:
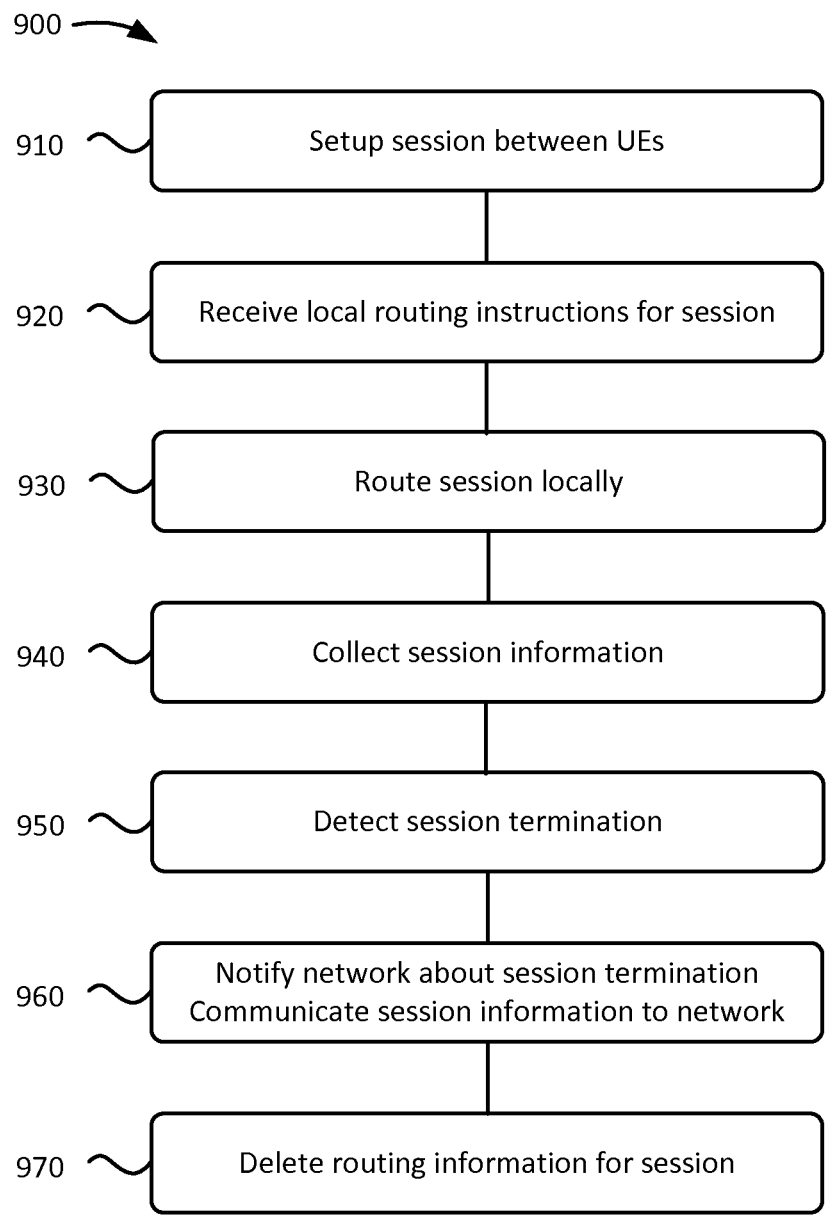
FIG. 9 is a flowchart of an example process for routing a call locally.

FIG. 9 is a flowchart diagram of an example process 900 for routing a call locally. Process 900 may be implemented by eNB 220. A brief description of process 900 is provided below as at least some of the operations of process 900 are discussed above with reference to the foregoing figures.

As shown, process 900 may include setting up a session between UEs 210. For example, eNB 220 may provide a RAN to which UEs 210 may attach and establish communication sessions with other UEs 210. In some implementations, one or more of the communication sessions may be a local session where UEs 210 communicating with one another are attached to the same eNB 220 or different eNBs 220 that have been logically grouped with one another and/or are operated by a single controller entity (e.g., eNB SDN controller 320). At the beginning of a communication session between UEs 210, NAT services may be provided by PGW 240, or another network device, instead of being provided by eNB 220.

Process 900 may include receiving local routing instructions for a session (block 920). For instance, at some point during the session, eNB 220 may receive instructions from another network device, such as SDN network controller 280, to begin routing a session locally. In some implementations, the instructions may include identities (e.g., private IP addresses and port numbers) of the UEs 210 corresponding to the sessions and instructions to begin collecting charging data information for the session.

Process 900 may include routing the session locally (block 930). For example, eNB 220 may implement one or more routing techniques to ensure that network traffic corresponding to the session remains within the corresponding RAN. Examples of such routing techniques may include hairpin routing where UEs 210 may send information to one another using destination IP addresses that are outside the RAN, but eNB 220 alters the destination addresses so that the information remains within the RAN. As such, the routing patterns and protocols of UEs 210 need not be updated or altered in order ensure that all of the information for the session is routed locally.

Process 900 may include collecting information corresponding to the session (block 940). For example, eNB 220 may collect information that describes the session between UEs 210. Examples of such information may include information pertaining to one or more charging policies of the corresponding wireless telecommunications network. For instance, session information may include an identifier of the session, a start time of the session, an end time of the session, a duration of the session, an amount of network traffic associated with the session, identifiers of the UEs 210 involved in the session, types of information communicated during the session, a quantity of information sent and received by each UE 210 during the session, a types network services used during the session (e.g., simple voice calls, conference calling, video calling, etc.

Process 900 may include detecting a session termination (block 950). For example, eNB 220 may detect that the session has been terminated. For instance, eNB 220 may determine that the session has ended by detecting the expiration of an activity timer (described above), by receiving a termination notification from a UE 210 involved in the session, etc.

Process 900 may include notifying a core network corresponding to eNB 220 regarding the session termination (block 960). For instance, in response to detecting that a session between UEs 210 has been terminated, eNB 220 may notify a network device, such as SDN network controller 280, that the session has been terminated. In addition, eNB 220 may provide SDN network controller 280 with session information collected by eNB 220 (see, e.g., block 940). As stated above, notifying SDN network controller 280 that the session has ended may enable NAT information within the core network to be deleted, thereby freeing up network resources to support other communication sessions. Additionally, providing SDN network controller 280 with session information may enable the wireless telecommunications network to implement accurate charging policies for communications that have been offloaded to local network resources (e.g., eNBs 220).

Process 900 may include deleting routing information for the session (block 970). For expel, eNB 220 may delete the routing information used to route the session locally. Doing so may make the device resources of eNB 220 more available to route other communication sessions locally, which in turn may disencumber the core network from having to route the corresponding session information. In some implementations, instead of deleting the routing information, eNB 220 may flag (or un-flag) the routing information so that routing information may be replaced with routing information for a subsequent local session as needed. As such, eNB 220 may enhance overall network performance by routing communication sessions locally in order to elevate core network devices that would otherwise be unnecessarily encumbered by the communication session.

Figure 10:
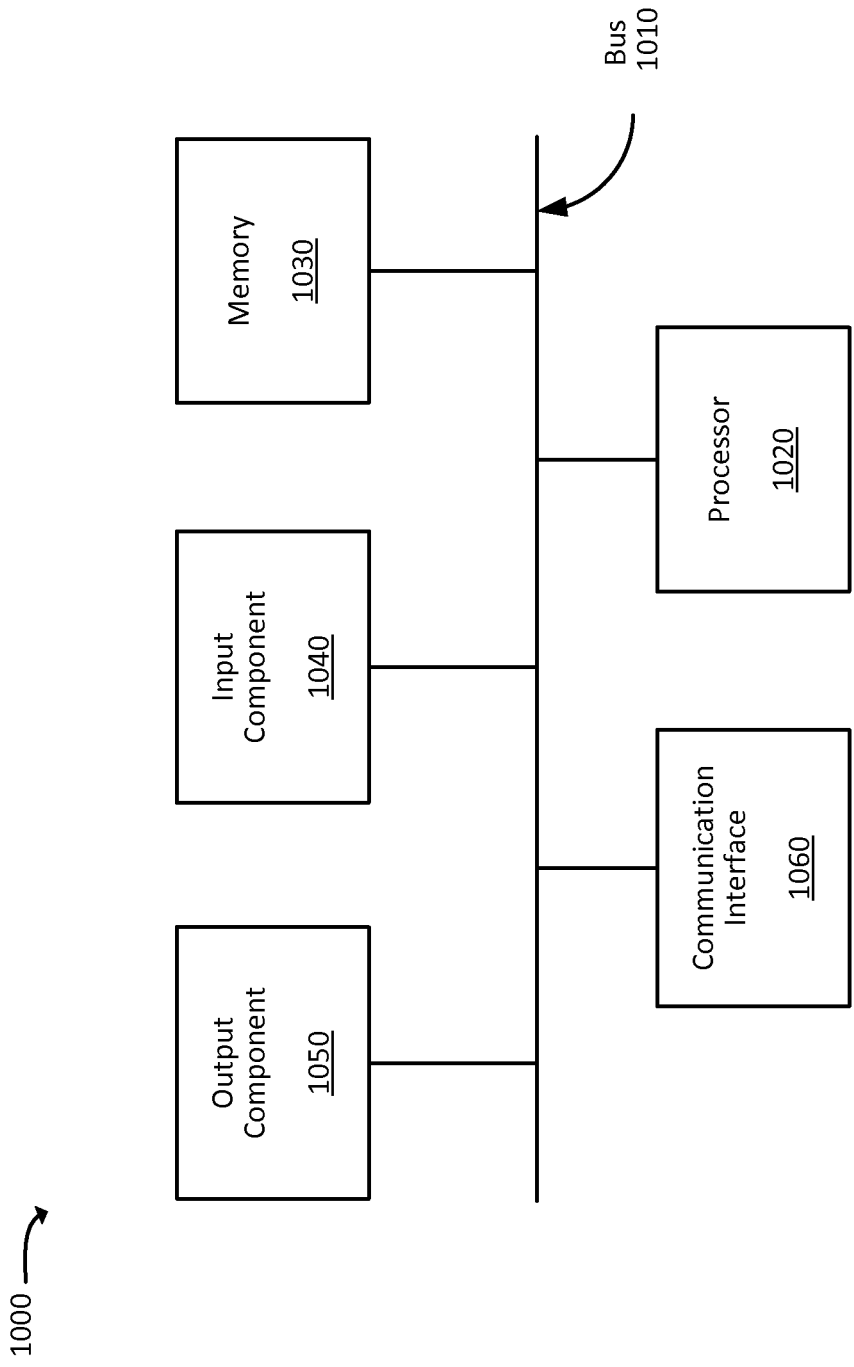
FIG. 10 is a diagram of example components of a device.

FIG. 10 is a diagram of example components of a device 1000. Each of the devices illustrated in FIGS. 1A-3, 5, 7, and 9 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 4-9, the order of the blocks and arrangement of the liens and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by one or more network devices, comprising:
   establishing, by the one or more network devices, a communication session involving user devices by routing the communication session through a core network of a wireless telecommunications network, the establishment of the communication session including maintaining network address translation (NAT) information describing information sent between the user devices during the communication session through the core network;
   determining, by the one or more network devices and based on the NAT information, that the user devices are both attached to a single radio access network (RAN) device of the wireless telecommunications network;
   identifying, by the one or more network devices, the RAN device to which the user devices are attached; and
   causing, by the one or more network devices, the communication session to be routed locally by the RAN device such that information sent between user devices during a remainder of the communication session is not routed through the core network.

2. The method of claim 1, further comprising:
   receiving a notification that the communication session has been terminated;
   receiving charging information, from the RAN device, corresponding to the communication session;
   combining the charging information with charging information collected by the one or more network devices while the communication session was routed through the core network; and
   providing the combined charging information to a network device designated for enforcing charging policies for the wireless telecommunications network.

3. The method of claim 1, further comprising:
   receiving a notification that the communication session has been terminated; and
   deleting the NAT information in response to the notification.

4. The method of claim 1, wherein causing the communication session to be routed locally by the RAN device includes:
   logically separating a control plane for the communication session and a user plane for the communication session; and
   causing the user plane for the communication session to be routed locally by the RAN device.

5. The method of claim 1, wherein the RAN device includes an Enhanced Node B and the user devices are both attached to the Enhanced Node B.

6. The method of claim 1, wherein causing the communication session to be routed locally by the RAN device includes:
   communicating a request to the RAN device to implement a hairpin routing technique with respect to the communication session.

7. The method of claim 1, wherein the RAN device includes an Enhanced Node B (eNB), and wherein the method further comprises:
   causing the communication session to be transferred from the core network to the eNB such that information sent to and from the user devices during the rest of the communication session is routed locally by the eNB and not the core network.

8. One or more network devices, comprising:
   a non-transitory memory device storing a plurality of processor-executable instructions; and
   a processor configured to execute the processor-executable instructions, wherein executing the processor-executable instructions causes the processor to:
      establish a communication session involving user devices by routing the communication session through a core network of a wireless telecommunications network, the establishment of the communication session including maintaining network address translation (NAT) information describing information sent between the user devices during the communication session through the core network;
      determine, based on the NAT information, that the user devices are both attached to a single radio access network (RAN) device of the wireless telecommunications network;
      identify the RAN device to which the user devices are attached; and
      cause the communication session to be routed locally by the RAN device such that information sent between the user devices during a remainder of the communication session is not routed through the core network.

9. The one or more network devices of claim 8, wherein executing the processor-executable instructions causes the processor further to:
   receive a notification that the communication session has been terminated;
   receive charging information, from the RAN device, corresponding to the communication session;

combine the charging information with charging information collected by the one or more network devices while the communication session was routed through the core network; and provide the combined charging information to a network device designated for enforcing charging policies for the wireless telecommunications network.

10. The one or more network devices of claim 8, wherein executing the processor-executable instructions causes the processor further to:

receive a notification that the communication session has been terminated; and delete the NAT information in response to the notification.

11. The one or more network devices of claim 8, wherein when causing the communication session to be routed locally by the RAN device, the processor-executable instructions cause the processor to:

logically separate a control plane for the communication session and a user plane for the communication session; and cause the user plane for the communication session to be routed locally by the RAN device.

12. The one or more network devices of claim 8, wherein the RAN device includes an Enhanced Node B and the user devices are both attached to the Enhanced Node B.

13. The one or more network devices of claim 8, wherein when causing the communication session to be routed locally by the RAN device, the processor-executable instructions cause the processor to:

communicate a request to the RAN device to implement a hairpin routing technique with respect to the communication session.

14. The one or more network devices of claim 8, wherein the RAN device includes an Enhanced Node B (eNB), and wherein executing the processor-executable instructions further causes the processor to:

cause the communication session to be transferred from the core network to the eNB such that information sent to and from the user devices during the rest of the communication session is routed locally by the eNB and not the core network.

15. One or more network devices, comprising:

a non-transitory memory device storing a plurality of processor-executable instructions; and a processor configured to execute the processor-executable instructions, wherein executing the processor-executable instructions causes the processor to:

create network address translation (NAT) information describing information sent between user devices during a call involving a core network of a wireless telecommunications network;

determine, based on the NAT information, that the user devices are both attached to a single Enhanced Node B (eNB) of the wireless telecommunications network;

identify the eNB to which the user devices are attached; and generate a notification that the user devices are both attached to the single eNB to enable the call to be routed locally by the eNB and not the core network.

16. The one or more network devices of claim 15, wherein executing the processor-executable instructions causes the processor further to:

cause the call to be transferred from the core network to the eNB such that information sent to and from the user devices during the rest of the call is routed locally by the eNB and not the core network.

17. The one or more network devices of claim 16, wherein executing the processor-executable instructions causes the processor further to:

receive a notification that the call has been terminated;

receive charging information, from the eNB, corresponding to the rest of the call;

combine the charging information with charging information collected by the one or more network devices while the call involved the core network; and provide the combined charging information to a network device designated for enforcing charging policies for the wireless telecommunications network.

18. The one or more network devices of claim 16, wherein executing the processor-executable instructions causes the processor further to:

maintain network address translation (NAT) information for the communication session while the communication session is routed locally by the eNB;

receive a notification that the communication session has been terminated; and delete the NAT information in response to the notification.

19. The one or more network devices of claim 16, wherein to cause the call to be routed locally by the eNB, the processor-executable instructions cause the processor to:

logically separate a control plane for the call and a user plane for the call; and cause the user plane for the communication session to be routed locally by the eNB.

20. The one or more network devices of claim 16, wherein to cause the communication session to be routed locally by the eNB, the processor-executable instructions cause the processor to:

communicate a request to the eNB to implement a hairpin routing technique with respect to the call.

* * * * *